United States Patent [19]

Ichihashi et al.

[11] Patent Number: 4,966,727
[45] Date of Patent: Oct. 30, 1990

[54] FERROELECTRIC LIQUID CRYSTAL MIXTURE FOR GUEST-HOST TYPE DISPLAY ELEMENTS

[75] Inventors: Mitsuyoshi Ichihashi; Kanetsugu Terashima; Makoto Kikuchi, all of Yokohamashi; Fusayuki Takeshita, Kawasakishi; Kenji Furukawa, Yokosukashi, all of Japan

[73] Assignee: Chisso Corporation, Japan

[21] Appl. No.: 124,559

[22] Filed: Nov. 24, 1987

[30] Foreign Application Priority Data

Nov. 28, 1986 [JP] Japan .................. 61-283257

[51] Int. Cl.$^5$ .................. C09K 19/34; C09K 19/52
[52] U.S. Cl. .................. 252/299.61; 252/299.01; 252/299.63; 252/299.64; 252/299.65; 252/299.66; 252/299.67; 350/350 R; 350/350 S
[58] Field of Search .................. 350/350 S; 252/299.01, 252/299.61, 299.63, 299.64, 299.65, 299.66, 299.67

[56] References Cited

U.S. PATENT DOCUMENTS

| | | | |
|---|---|---|---|
| 4,596,667 | 6/1986 | Inukai et al. | 252/299.65 |
| 4,613,209 | 9/1986 | Goodby et al. | 350/350 S |
| 4,622,165 | 11/1986 | Kano et al. | 252/299.65 |
| 4,668,427 | 5/1987 | Saito et al. | 252/299.66 |
| 4,729,847 | 3/1958 | Miyazawa et al. | 252/299.64 |
| 4,751,019 | 6/1988 | Saito et al. | 252/299.66 |
| 4,769,176 | 9/1988 | Bradshaw et al. | 252/299.65 |
| 4,780,241 | 10/1988 | Furukawa et al. | 252/299.63 |
| 4,780,242 | 10/1988 | Miyazawa et al. | 252/299.65 |
| 4,795,587 | 1/1989 | Ohno et al. | 252/299.61 |
| 4,826,621 | 5/1989 | Terashima et al. | 252/299.61 |

FOREIGN PATENT DOCUMENTS

| | | | |
|---|---|---|---|
| 164814 | 12/1985 | European Pat. Off. | |
| 201341 | 11/1986 | European Pat. Off. | 252/299.01 |
| 220747 | 5/1987 | European Pat. Off. | 252/299.01 |

Primary Examiner—Robert L. Stoll
Assistant Examiner—Richard Treanor
Attorney, Agent, or Firm—Leydig, Voit & Mayer

[57] ABSTRACT

A ferroelectric smectic C liquid crystal mixture having a smectic A phase region within 30° C. on the higher temperature side relative to a chiral smectic C phase and also having a tilt angle at its chiral smectic C phase in the range of 30° to 60°.

9 Claims, 2 Drawing Sheets

FERROELECTRIC LIQUID CRYSTAL MIXTURE FOR GUEST-HOST TYPE DISPLAY ELEMENTS

BACKGROUND OF THE INVENTION

1. Field of the Invention

This invention relates to a ferroelectric liquid crystal composition and more particularly it relates to a ferroelectric liquid crystal material suitable for guest-host type display elements containing a dichroic dyestuff.

2. Description of the Related Art

At present, liquid crystal compounds have been broadly used for display materials, and most of such liquid crystal display elements rely on a TN (Twisted Nematic) display mode, and also liquid crystal materials used belong to a nematic phase. Display elements by way of this TN display mode have come to be rapidly used making use of specific features which do not tire the eyes. Due to their non-emissive type, their electric power consumption is very small and they are lightweight and of small size. Those having a large display area have recently been also prepared, but a drawback that the response is slow and the display cannot be seen depending on angle of view has not yet been overcome. In order to make use of the merits of liquid crystal display elements and supplement their shortcomings, development of a novel display mode in place of the TN display mode is indispensable. One of such attempts is a display element utilizing the light-switching phenomenon of ferroelectric liquid crystals proposed by N. A. Clark et al (see Applied Physics Letters, 36, 899 (1980)). The presence of ferroelectric liquid crystals has been elucidated by R. B. Meyer et al for the first time in 1975 (see J. de Phys., 36L, 69 (1975)), and ferroelectric properties are developed only in the case of smectic phases having a helical structure (chiral smectic phases). It has been known that chiral smectic phases include smectic C phases, I phases and F phases (hereinafter abbreviated to $S_C^*$ phase, $S_I^*$ phase and $S_F^*$ phase).

In the chiral smectic phases, liquid crystals form layers, the molecules of the crystals tilt against the respective surfaces of the layers and the tilt direction deviates little by little from one of the layers to the succeeding ones to form a helical structure, the helical axis thereof being perpendicular to the surfaces of the layers. In the chiral smectic phases, spontaneous polarization is formed and hence when a direct current electric field in the direction parallel to the layers is impressed thereto, the molecules are inverted around the helical axis as a rotating axis depending on the polarity of the polarization. The display elements making use of the ferroelectric liquid crystals utilize this switching phenomenon.

Among the chiral smectic phases; the $S_C^*$ phase has now been particularly noted. As the display mode utilizing the switching phenomenon of the $S_C^*$ phase, two modes are considered. One mode is of a birefringent type using two sheets of polarizers and another mode is of a guest-host type utilizing dichroic dyestuffs.

The specific features of these display modes consist in that (1) the response rate is very high;
(2) there are memory properties;
(3) the dependency on angle of view is small; etc.; hence the modes have the possibility of a high density display and are very attractive. In addition thereto, according to the display mode of the guest-host type, since only one sheet of polarizer is used, the mode has the following superior specific features:

(4) there is no coloration due to retardation; and
(5) the quantity of transmitted light is so large that the image is bright and readily visible. In particular, the item (4) means that it is unnecessary to precisely control the cell thickness of display elements; hence the mode is commercially very favorable.

The main conditions required for ferroelectric liquid crystal materials used for display elements of guest-host type are as follows:

(1) the tilt angle is in the range of 30° to 60°;
(2) the alignment properties are good;
(3) the materials have an $S_C^*$ phase which is stably operable at room temperature;
(4) the spontaneous polarization is great;
(5) the helical pitch is long; etc.

Particularly, the conditions of the tilt angle and alignment property are indispensable because display elements which do not satisfy these conditions bring about notable reduction in the contrast.

The range of the above tilt angle is calculated as follows:

The absorption intensity is calculated by means of dyestuffs, of display elements of the guest-host type having a tilt angle of $\theta$ is proportional to $\sin^2(2\theta)$ and maximal at $\theta = 45°$. In this case, even 75% of the maximum absorption intensity does not differ so much practically from that at $\theta = 45°$ in the aspect of contrast; hence the range of $\theta$ affording 75% of the maximum absorption intensity, that is, the limit of $\theta$ which is tolerable in the aspect of contrast, can be calculated as being in the range of 30° to 60°.

Further, with regard to the uniformity of alignment, the following has been known:

When the alignment of liquid crystal molecules is non-uniform, that is, the so-called multi-domain state is formed, unevenness is formed in the resulting display so that the contrast ratio is reduced or the display surface is colored, which results in a notable reduction in the display quality. There is an intimate relation between the alignment property and the kinds of phases existent on the higher temperature side relative to $S_C^*$ phase. In short, in the case of liquid crystals having a smectic A phase (abbreviated to $S_A$ phase) on the higher temperature side relative the $S_C^*$ phase, since the normal direction to the layer surface accords with the direction of the major axis of liquid crystal molecule, a relatively good aligned state is obtained, whereas in the case of liquid crystals having no $S_A$ phase on the higher temperature side relative to an $S_C^*$ phase, a cholesteric phase (abbreviated to Ch phase) or an isotropic liquid phase (abbreviated to I phase), during the cooling process of the material, transits directly into the $S_C^*$ phase having two stable energetically degenerated directions along which the major axis of the liquid crystal molecules may be oriented. Thus, without breaking this energetic degeneracy by impressing an electric field or the like thereto at the time of alignment, a good aligned state is not obtained; hence the material is not practical. In short, in the aspect of the alignment property, the compounds having an $S_A$ phase on the higher temperature side relative to the $S_C^*$ phase are far superior to those having no $S_A$ phase on the higher temperature side relative to the $S_C^*$ phase (for example, see Japanese patent application laid-open No. Sho 61-255323).

Currently known ferroelectric liquid crystal compounds are illustrated in Table 1. The reports and the literature describing these compounds are found in PH. Martinot-Lagarde et al., Mol. Cryst. Liq. Cryst., 75, 249 (1981); Inukai et al, collected preprints for the 10th Liquid Crystal Symposium, pp 164, pp 166 (1984); Kayako Hori, collected preprints for the 10th Liquid Crystal Symposium, pp 112 (1984); Inukai et al, collected preprints for the 11th International Liquid Crystal Conference, $\theta$-018-FE (1986); etc.

As apparent from Table 1, among currently known ferroelectric liquid crystal compounds, most of the compounds having tilt angles of 30° or more at their $S_C^*$ phase are compounds having no $S_A$ phase on the higher temperature side relative to $S_C^*$ phase, while most of compounds having an $S_A$ phase thereon are compounds having a tilt angle of 26° or less. Thus it has been considered that there is an intimate relation between the phase series of liquid crystal compounds and the tilt angle thereof (for example, see Tetsuro Ohtsuka, collected preprints for the 12th Liquid Crystal Symposium, pp 98 (1986)).

Namely, compounds having an $S_A$ phase on the higher temperature side relative to the $S_C^*$ phase are superior in the alignment property, but since they have a tilt angle of 26° or less, they are inferior in the aspect of contrast, while compounds having no $S_A$ phase thereon are inferior in the aspect of the alignment property. Thus it is impossible to use the existing compounds, as they are, as materials for display elements of the guest-host type.

TABLE 1

| Compound | Phase transition point | Tilt angle (°) $T-T_c = -10°$ C. | Tilt angle (°) $T-T_c = -20°$ C. |
|---|---|---|---|
| A1 $C_8H_{17}O$-⟨phenyl⟩-CH=N-⟨phenyl⟩-⟨phenyl⟩-CO-O-CH(CH₃)CH₂CH₃* (O=) | $C \xrightarrow{41.3} S_A \xrightarrow{66.0} I$; $S_A \xrightarrow{39.3} S_{C^*}$ | 23 | |
| A2 $C_8H_{17}O$-⟨phenyl⟩-⟨phenyl⟩-CO-O-CH(CH₃)CH₂CH₃* (O=) | $C \xrightarrow{46.1} S_A \xrightarrow{63.5} I$; $S_A \xrightarrow{43.9} S_{C^*}$ | 22 | |
| A3 $C_8H_{17}O$-⟨phenyl⟩-O-CH₂*CH(CH₃)CH₂CH₃ ... | $C \xrightarrow{46.3} S_A \xrightarrow{57.8} I$; $S_A \xrightarrow{42.1} S_{C^*}$; $S_B \xrightarrow{22.0} S_{C^*}$ | 19.8 | |
| A4 $C_8H_{17}O$-⟨phenyl⟩-⟨phenyl⟩-CO-O-⟨phenyl⟩-O-CH₂*CH(CH₃)CH₂CH₃ | $C \xrightarrow{101.3} S_{C^*} \xrightarrow{149.9} S_A \xrightarrow{189.3} I$; $S_{C^*} \xrightarrow{104.3} S_B$ | 15.6 | 18.6 |
| A5 $C_8H_{17}O$-⟨phenyl⟩-CH=N-⟨phenyl⟩-CH=CH-CO-CHCl-CH₂CH₃* | $C \xrightarrow{60} S_{H^*} \xrightarrow{64} S_{C^*} \xrightarrow{78} S_A \xrightarrow{135} I$ | 15.1 | 20.3 |
| A6 $C_8H_{17}O$-⟨phenyl⟩-CH=N-⟨phenyl⟩-CH=C(CH₃)-CO-O-CH₂-CH(CH₃)*CH₂CH₃ | $C \xrightarrow{49} S_{C^*} \xrightarrow{58} S_A \xrightarrow{94} I$ | 16.3 | 21.2 |
| B1 $C_8H_{17}O$-⟨phenyl⟩-⟨phenyl⟩-O-CO-⟨phenyl⟩-OCH(CH₃)C₆H₁₃* | $C \xrightarrow{91.4} S_{C^*} \xrightarrow{95.4} Ch \xrightarrow{136.7} I$ | 44 | 45 |
| B2 $C_8H_{17}O$-⟨phenyl⟩-⟨phenyl⟩-O-CO-⟨phenyl⟩-OCH(CH₃)C₆H₁₃* | $C \xrightarrow{69.8} S_{C^*} \xrightarrow{100.8} Ch \xrightarrow{125.3} I$ | 32 | 34 |

TABLE 1-continued

| Compound | Phase transition point | Tilt angle (°) | |
|---|---|---|---|
| | | $T-T_c = -10°$ C. | $T-T_c = -20°$ C. |
| B3 $C_8H_{17}O$—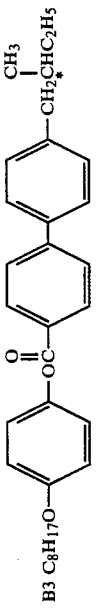—$CH_2\overset{*}{C}HC_2H_5$ with $CH_3$ branch | $C \xrightarrow{76} S_{C^*} \xrightarrow{88.6} Ch \xrightarrow{155.4} I$ | 45 | 45 |

In Table 1, the tilt angle refers to values measured at a temperature lower by 10° C. or 20° C. than the upper limit temperature of $S_{C^*}$ phase (expressed by $T-T_c = -10°$ C. or $T-T_c = -20°$ C., respectively). In the column of the phase transition point, C, $S_B$ and $S_H^*$ mean crystalline phase, smectic B phase and chiral smectic H phase, respectively.

SUMMARY OF THE INVENTION

As apparent from the foregoing, a main object of the present invention is to provide a ferroelectric chiral smectic liquid crystal composition having a tilt angle in the range of 30° to 60° and a superior alignment property. Another object of the present invention is to provide a light switching element of the guest-host type having a quick response and a superior contrast.

The present inventors have made extensive research on ferroelectric liquid crystal compounds and ferroelectric liquid crystal compositions containing the compounds as component(s) thereof, noting the correlationship between the phase transition manner thereof and the tilt angle thereof at its $S_C^*$ phase, and as a result have completed the present invention.

In short, we have found that when at least one of the compounds having an $S_A$ phase on the higher temperature side relative to the $S_C^*$ phase is mixed with at least one of the compounds having no $S_A$ phase thereon and the temperature range of $S_A$ phase of the resulting composition is adjusted so as to fall within 30° C., then a ferroelectric liquid crystal composition having $S_A$ phase and also having a tilt angle at its $S_C^*$ phase of 30° or more is obtained.

The present invention in a first aspect resides in (1) a ferroelectric smectic C liquid crystal mixture having a smectic A phase region within 30° C. on the higher temperature side relative to a chiral smectic C phase and also having a tilt angle at its chiral smectic C phase in the range of 30° to 60°, which mixture is (i) a mixture comprising at least one liquid crystal having a smectic A phase region within 40° C. on the higher temperature side relative to a chiral smectic C phase and at least one liquid crystal having a chiral smectic C phase or achiral smectic C phase and having no smectic A phase region;

(ii) a mixture comprising at least one liquid crystal having a smectic A phase region within 40° C. on the higher temperature side relative to an achiral smectic C phase and at least one liquid crystal having a chiral smectic C phase and having no smectic A phase region; or (iii) a mixture comprising at least one liquid crystal having smectic A phase region within 40° C. on the higher temperature side relative to achiral smectic C phase, at least one liquid crystal having achiral smectic C phase and having no smectic A phase region and at least one optically active substance.

The present invention in a second aspect resides in a light switching element using a ferroelectric smectic C liquid crystal mixture as set forth in the item (1).

BRIEF DESCRIPTION OF THE DRAWINGS

In FIG. 2, $S_C^*$, $S_A$ and I represent a chiral smectic C phase, a smectic A phase and an isotropic liquid phase, respectively.

DESCRIPTION OF PREFERRED EMBODIMENTS

As described above, the tilt angle relative to ferroelectric liquid crystal phases of currently known compounds varies depending on the kind of phases on the higher temperature side relative to the $S_C^*$ phase. For example, there is a tendency that in the case where a compound exhibits an $S_A$ phase on the higher temperature side relative to the $S_C^*$ phase, the tilt angle is small even in a considerably low temperature region of the $S_C^*$ phase ($\theta < 26°$), while in the case where a compound exhibits no $S_A$ phase on the higher temperature side relative to the $S_C^*$ phase, the tilt angle is large ($\theta \geq 30°$).

However, the present inventors have found that some of the compositions obtained by mixing a compound exhibiting an $S_A$ phase on the higher temperature side relative to the $S_C^*$ phase with a compound exhibiting no $S_A$ phase thereon exhibit an $S_A$ phase and yet have a large tilt angle ($\theta \geq 30°$) in the form of the composition; hence, the above-mentioned tendency in the case of compounds does not always apply to liquid crystal compositions, and have completed the present invention. This will be described below by way of examples.

Figure 1:
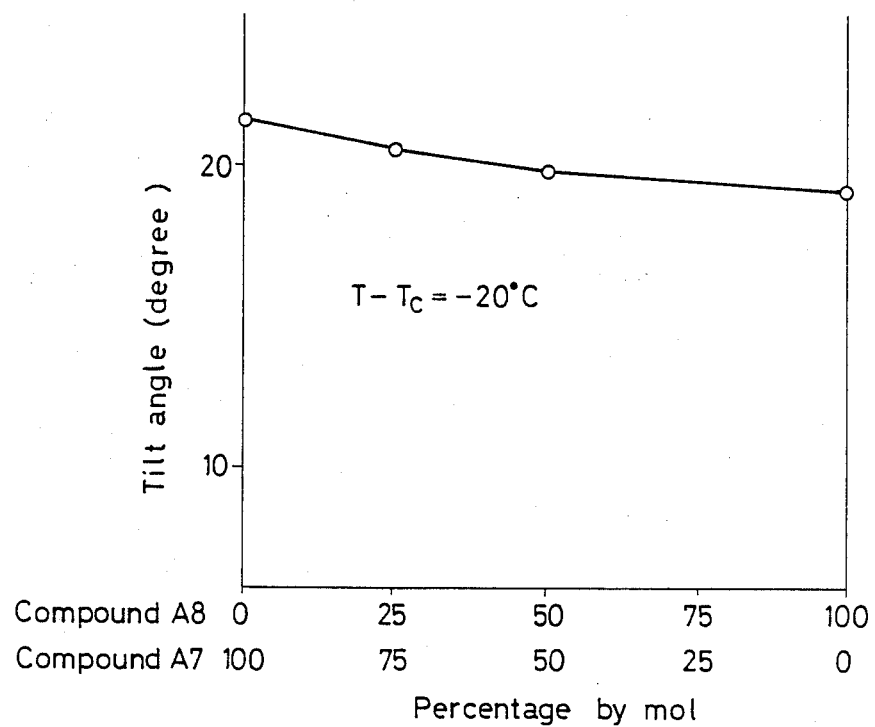
FIG. 1 and FIG. 2 show a chart illustrating the composition-dependency of the tilt angle of a smectic C liquid crystal mixture of a binary component system consisting of compounds A7 and A8 and a phase chart of the mixture.
Figure 2:
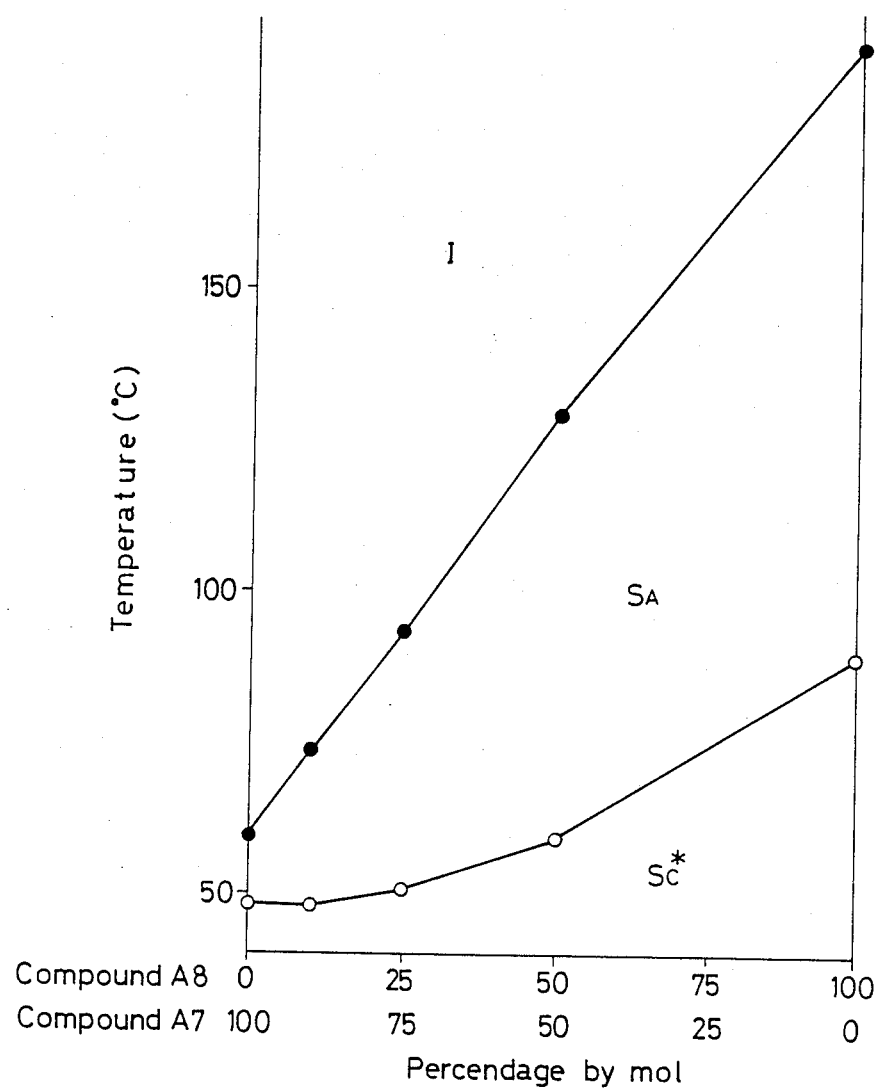

A binary component mixture system consisting of a compound exhibiting an $S_A$ phase of the higher temperature side relative to an $S_C^*$ phase and having a small tilt angle, that is,

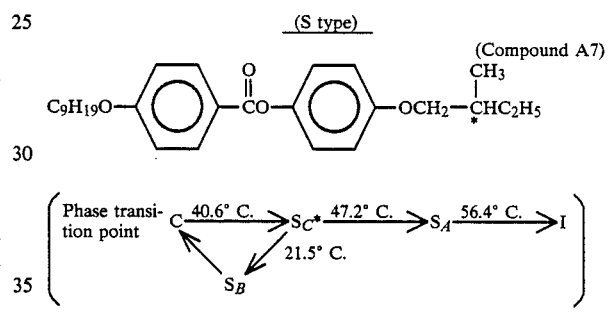

and a compound similarly exhibiting an $S_A$ phase on the higher temperature side relative to $S_C^*$ phase and having a small tilt angle, that is,

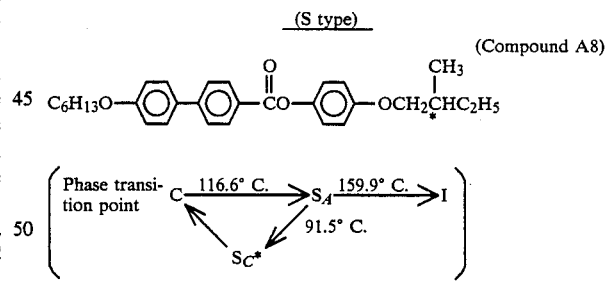

has a concentration-dependency of the tilt angle and that of a phase transition point as shown in FIG. 1 and FIG. 2, respectively. As apparent from the two figures, in the case of the mixture system of compound A7 and compound A8 both exhibiting an $S_A$ phase on the higher temperature side relative to the $S_C^*$ phase, any of the compositions exhibit an $S_A$ phase on the higher temperature side relative to the $S_C^*$ phase, but the tilt angles do not exceed 30°. As to the tilt angle, a nearly positive additive property comes into existence. Thus, it is seen that even when a composition is composed only of two compounds both having a small tilt angle, that is, having the $S_A$ phase on the higher temperature side relative to the $S_C^*$ phase, it is impossible to obtain a composition having a large tilt angle.

Similarly, a binary component mixture system consisting of a compound exhibiting no $S_A$ phase on the higher temperature side relative to the $S_C{}^*$ phase and having a large tilt angle, that is, (R type)

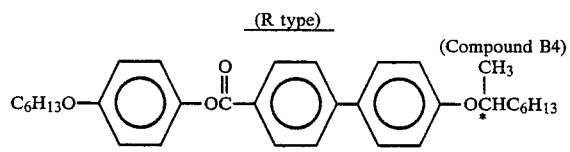
(Compound B4)

and a compound similarly exhibiting no $S_A$ phase and having a large tilt angle, that is, (R type)

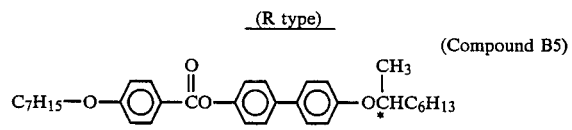
(Compound B5)

has a phase transition behavior in which that the system exhibits no $S_A$ phase on the higher temperature side relative to the $S_C{}^*$ phase in any of the composition ratios. In this combination, too, an additive property relative to the tilt angles comes into existence. The mixture having mixing proportions of compound B4 and compound B5 of each 50% by weight has a tilt angle of 40° at $T-T_c = -30°$ C. and hence a sufficiently large tilt angle can be obtained in the case of this composition, but it is impossible to obtain a composition having an $S_A$ phase on the higher temperature side relative to the $S_C{}^*$ phase.

On the other hand, a binary component mixture (I) consisting of a compound exhibiting an $S_A$ phase on the higher temperature side relative to the $S_C{}^*$ phase and having a small tilt angle, that is, (R type)

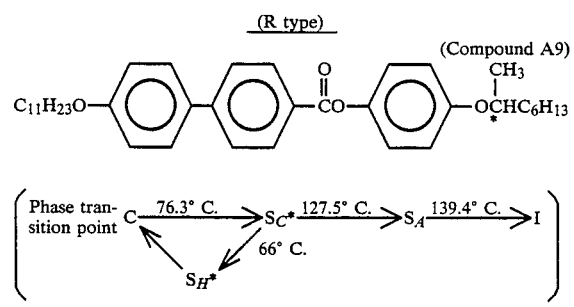
(Compound A9)

in 60% by weight, and a compound exhibiting no $S_A$ phase at the higher temperature side relative to the $S_C{}^*$ phase and a large tilt angle, that is, (R type)

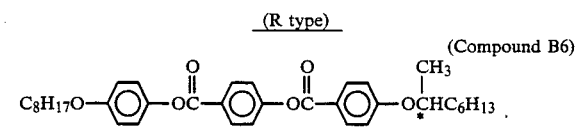
(Compound B6)

in 40% by weight, exhibits an $S_C{}^*$ phase in the temperature range of 60° to 110.5° C., has an $S_A$ phase on the higher temperature side relative thereto, forms a Ch phase at 117.8° C. and forms an isotropic liquid at 123.0° C. This composition has the $S_A$ phase on the higher temperature side relative to the $S_C{}^*$ phase and nevertheless has a tilt angle as large as 34° at $T-T_c = -30°$ C.

Thus, when a compound having an $S_A$ phase on the higher temperature side relative to the $S_C{}^*$ phase is mixed with a compound having no $S_A$ phase thereon, it is possible to obtain a composition provided with such entirely novel specific features never seen in the case of conventional compounds that the composition has the $S_A$ phase on the higher temperature side relative to the $S_C{}^*$ phase and nevertheless has a tilt angle as large as 34°.

However, a binary component mixture (II) consisting of a compound having a similar structure to that of compound A9 and exhibiting a similar phase transition behavior, but having an $S_A$ phase-exhibiting temperature range as broad as 41° C., that is, (R type)

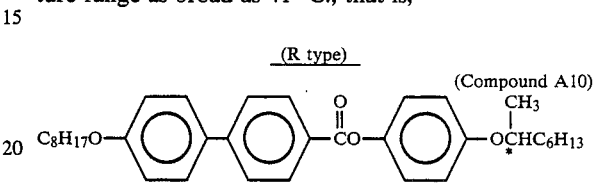
(Compound A10)

in 60% by weight, and the above-mentioned compound B6 in 40% by weight, has the following phase transition points:

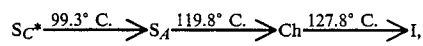

but its tilt angle at $T-T_c = -30°$ C. is as small as 28.5° as compared with that of the above-mentioned mixture. This indicates that a mere admixture of a compound having an $S_A$ phase on the higher temperature side relative to the $S_C{}^*$ phase with a compound having no $S_A$ phase thereon does not afford a composition having a large tilt angle; in other words, when compositions are prepared, a composition affording a large tilt angle and a composition not affording it are present.

The largest difference between compound A9 and compound A10, wherein the difference between the numbers of carbon atoms of the terminal alkyl chains of these compounds is only 3, consists in the temperature range exhibiting the $S_A$ phase is about 12° C. in the case of compound A9, while it is about 41° C. in the case of compound A10, that is, there is a difference as large as about 30° C. In the case of the $S_A$ phase, since molecules stand vertically relative to the layer surface thereof, it is considered that a compound having a broader temperature range of the $S_A$ phase tends to stand more vertically than a compound having a narrower temperature range of the $S_A$ phase. Even when the molecules are in the $S_C{}^*$ phase, the above-mentioned tendency will be retained since the phase still has the properties of the molecules; hence, when a compound having no $S_A$ phase on the higher temperature side relative to the $S_C{}^*$ phase but having a large tilt angle is added, it is considered that the compound having a narrower temperature range of the $S_A$ phase will be more affected by the tilt angle. In fact, in spite of equal quantities of compounds having been mixed, the tilt angle of the mixture (I) using compound A9 having a narrower temperature range of the $S_A$ phase is larger than that of the mixture (II) using compound A10 having a broader temperature range of the $S_A$ phase. Further, with regard to the temperature range of the $S_A$ phase of compositions, too it is presumed from the above-mentioned mechanism that compositions having a temperature range of the $S_A$ phase as narrow as possible afford a larger tilt angle.

Next, a binary component mixture (III) was prepared, which consisted of a compound having a similar structure to those of compounds A9 and A10, but having a temperature range of the $S_A$ phase of 22° C. which is between those of the two compounds, that is, (R type)

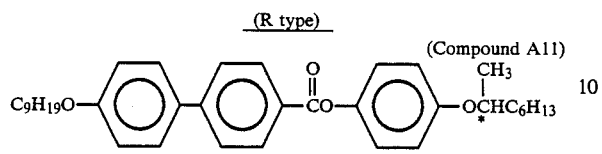
(Compound A11)

in 60% by weight, and the above-mentioned compound B6 in 40% by weight.

The phase transition points of this composition were as follows:

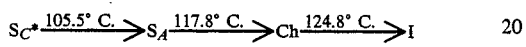

and its tilt angle at $T-T_c=-30°$ C. was 32.5°. The temperature range of the $S_A$ phase and the tilt angle of the composition (III) are respectively positioned between those of the compositions (I) and (II). This indicates that the temperature range of the $S_A$ phase of compounds has an intimate relation with these values.

The present inventors have further made extensive research based on these facts and as a result have found that when compounds constituting an $S_A$ phase component in a composition and having the $S_A$ phase on the higher temperature side relative to the $S_C^*$ phase or compositions consisting only of these compounds, which compounds or compositions have a temperature range of the $S_A$ phase within 40° C., preferably within 30° C., are used, it is possible to make the temperature range of the $S_A$ phase of the objective compositions fall within 30° C., preferably within 20° C. and also to enlarge the tilt angle at their $S_C^*$ phases.

Several rules already obtained by experience in liquid crystal mixtures are helpful to make an $S_A$ phase on the higher temperature side relative to the $S_C^*$ phase of the mixture or to adjust the temperature range of an $S_A$ phase of the objective mixtures. For example, in the case where an $S_A$ phase is absent on the higher temperature side relative to the $S_C^*$ phase in the mixture, the component proportion of a compound having an $S_A$ phase thereon may be increased, while in the case where an $S_A$ phase is present in the mixture, the temperature range of the $S_A$ phase becomes narrow by raising the mixing proportion of the compound having no $S_A$ phase, while the temperature range of the $S_A$ phase becomes broad by raising the mixing proportion of the compound having an $S_A$ phase.

The foregoing shows that in a binary component mixture system consisting of a liquid crystal having an $S_C^*$ phase and an $S_A$ phase having a temperature range within 40° C. and a liquid crystal having an $S_C^*$ phase and having no $S_A$ phase, an $S_C^*$ liquid crystal having an $S_A$ phase and a tilt angle of 30° or more is obtained.

Next, it will be shown that the above fact is not limited only to the binary component mixture system.

A ferroelectric liquid crystal composition A consisting only of the following compounds having the $S_A$ phase on the higher temperature side relative to the $S_C^*$ phase:

(S type)
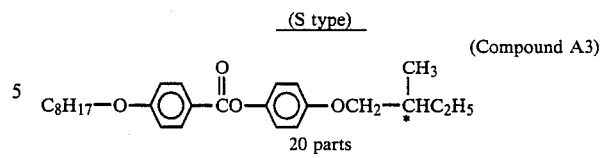
(Compound A3)

20 parts

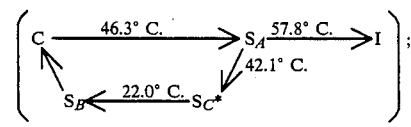

(S type)
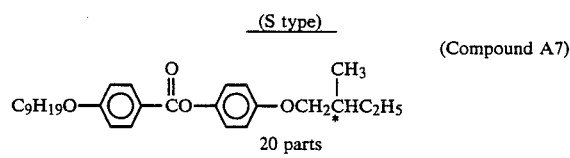
(Compound A7)

20 parts

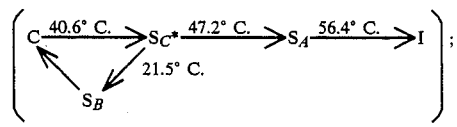

(S type)
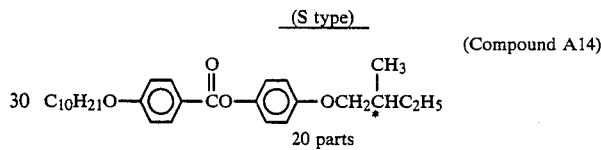
(Compound A14)

20 parts

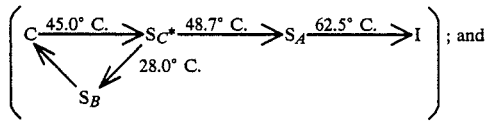

(S type)
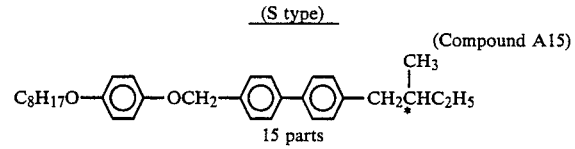
(Compound A15)

15 parts

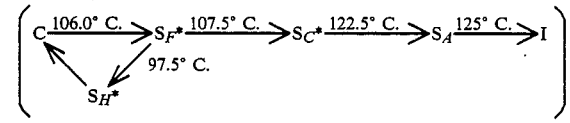

has the following phase transition points and a temperature range of the $S_A$ phase of 13.7° C.:

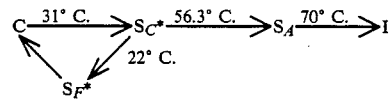

All the constituents of the composition A have the $S_A$ phase on the higher temperature side relative to the $S_C^*$ phase, and as a result, the composition A naturally also has the $S_A$ phase. Since it has the $S_A$ phase, its alignment property is considerably good, but it has a tilt angle at 25° C. as small as a 22° and hence, it is unsuitable as liquid crystal materials of the guest-host type.

A ferroelectric liquid crystal composition B obtained by mixing 75 parts of the composition A with 25 parts of the following compound B7 having no $S_A$ phase on the higher temperature side relative to the $S_C{}^*$ phase:

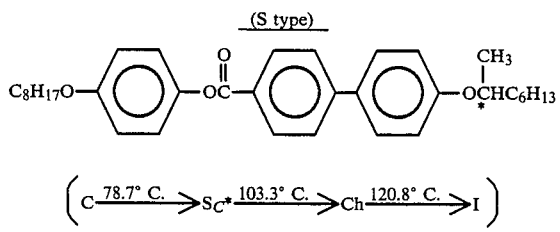

had the following phase transition points:

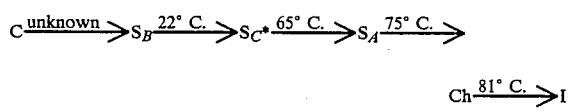

This composition has an $S_A$ phase and nevertheless has a tilt angle at 25° C. as large as 30° and hence is suitable as liquid crystal materials of the guest-host type.

As described above, according to the composition of the present invention, it is possible to obtain an entirely novel specific feature of having an $S_A$ phase on the higher temperature side relative to the $S_C{}^*$ phase and having a tilt angle 30°, which specific feature has never been observed in the case of liquid crystal compounds obtained so far. Since it has an $S_A$ phase and yet tilt angle of 30°, it is a ferroelectric liquid crystal material very suitable for a guest-host mode display in the aspect of alignment property as well as in the aspect of contrast.

Although the above example is directed to a mixture system of a chiral smectic liquid crystal compound and a chiral smectic liquid crystal compound, this applies also to a mixture system of a chiral smectic liquid crystal and a smectic liquid crystal having no asymmetric center.

In short, a binary component mixture consisting of a smectic liquid crystal compound exhibiting no $S_A$ phase on the higher temperature side relative to the smectic C phase (abbreviated to $S_C$ phase), and having an asymmetric center that is,

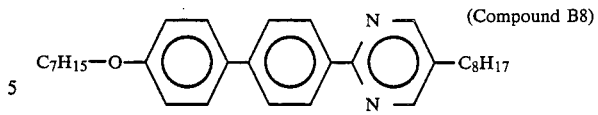

in 70% by weight, and the above-mentioned compound A9 as a chiral smectic liquid crystal compound having $S_A$ phase on the higher temperature side relative to the $S_C{}^*$ phase in 30% by weight forms an $S_C{}^*$ phase from 60° C. up to 151.2° C., exhibits an $S_A$ phase on the higher temperature side relative thereto, exhibits a transition into Ch phase at 152.3° C. and forms isotropic liquid at 160.8° C. This composition has a tilt angle of 33° at $T-T_c=30°$ C., which is very large in spite of having an $S_A$ phase.

Even when a chiral smectic liquid crystal compound exhibiting no $S_A$ phase on the higher temperature side relative to the $S_C{}^*$ phase and a liquid crystal compound exhibiting the $S_A$ phase on the higher temperature side relative to the $S_C$ phase and having no asymmetric center are mixed together, a large tilt angle is obtained by making the $S_A$ phase having a temperature range within 30° C. present on the higher temperature side relative to the $S_C{}^*$ phase of the mixture.

Liquid crystal substances having an $S_A$ phase of a temperature range within 40° C. on the higher temperature side relative to the $S_C{}^*$ phase or the $S_C$ phase, which are preferably used in the present invention, are illustrated in Table 2. In the present invention, liquid crystal substances having a narrow $S_A$ phase range and a relatively large tilt angle at the $S_C{}^*$ phase are particularly preferably used. Further, liquid crystal substances used in the present invention as liquid crystal substances having an $S_C{}^*$ phase or $S_C$ phase and having no $S_A$ phase are illustrated in Table 3. In Tables 2 and 3, phases on the higher temperature side relative to the $S_C{}^*$ phase or the $S_C$ phase are shown. With regard to compounds having an $S_C{}^*$ phase range of 20° C. or higher, values of tilt angle at a temperature (T) lower by 20° C. than the upper transition temperature (Tc) of the $S_C{}^*$ phase are shown. In addition, liquid crystal substances usable in the present invention are not limited to these listed liquid crystal substances. In these Tables, N and I mean nematic phase and isotropic liquid phase, respectively.

TABLE 2

| Compound | | Temperature range of $S_A$ phase | Phase on the higher temperature side relative to $S_C{}^*$ phase or $S_C$ phase | Tilt angle (T-T$_c$ = -20° C.) |
|---|---|---|---|---|
| A16 | 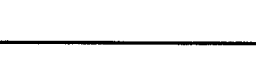 | 6.5° C. | $S_A$ | |
| A17 |  | 10° C. | $S_A$ | |

TABLE 2-continued

| Compound | Temperature range of $S_A$ phase | Phase on the higher temperature side relative to $S_{C^*}$ phase or $S_C$ phase | Tilt angle (T-T$_c$ = -20° C.) |
|---|---|---|---|
| A18  C$_8$H$_{17}$—[pyrazine]—[C$_6$H$_3$F]—OC$_6$H$_{13}$ | 9.4° C. | $S_A$ | |
| A19  C$_8$H$_{17}$—[pyrazine]—[C$_6$H$_3$F]—O(CH$_2$)$_5$*CHCH$_3$C$_2$H$_5$ | 10° C. | $S_A$ | |
| A20  C$_7$H$_{15}$—[pyridine]—[C$_6$H$_3$F]—O(CH$_2$)$_3$*CHCH$_3$C$_2$H$_5$ | 2.0° C. | $S_A$ | 26.5° |
| A21  C$_7$H$_{15}$—[pyridine]—[C$_6$H$_3$F]—OC$_8$H$_{17}$ | 7.4° C. | $S_A$ | |
| A22  C$_8$H$_{17}$O—[phenyl]—[phenyl]—(CH$_2$)$_3$*CHCH$_3$C$_2$H$_5$ | 2.6° C. | $S_A$ | |
| A23  C$_8$H$_{17}$—O—[phenyl]—OCH$_2$—[phenyl]—[phenyl]—CH$_2$—*CHCH$_3$C$_2$H$_5$ | 1.6° C. | $S_A$ | 21.8° |
| A24  C$_9$H$_{19}$—O—[phenyl]—CO—O—[phenyl]—[C$_6$H$_3$F]—O*CHCH$_3$C$_6$H$_{13}$ | 22.0° C. | $S_A$ | 25° |
| A25  C$_{11}$H$_{23}$O—[phenyl]—CO—O—[phenyl]—O—CO—[phenyl]—O*CHCH$_3$C$_6$H$_{13}$ | 19.5° C. | $S_A$ | 25° |
| A26  C$_8$H$_{17}$O—[C$_6$H$_3$F]—[phenyl]—CO—O—[phenyl]—O*CHCH$_3$C$_6$H$_{13}$ | 21° C. | $S_A$ | 28° |
| A27  C$_8$H$_{17}$—[phenyl]—O—CO—[phenyl]—[C$_6$H$_3$F]—O*CHCH$_3$C$_6$H$_{13}$ | 9.6° C. | $S_A$ | 25° |
| A28  C$_5$H$_{11}$—[phenyl]—O—CO—[phenyl]—[phenyl]—O*CHCH$_3$C$_6$H$_{13}$ | 8.5° C. | $S_A$ | 27° |

TABLE 2-continued

| Compound | Temperature range of $S_A$ phase | Phase on the higher temperature side relative to $S_C*$ phase or $S_C$ phase | Tilt angle (T-T$_c$ = −20° C.) |
|---|---|---|---|
| A29  C$_8$H$_{17}$—⟨biphenyl⟩—O—C(=O)—⟨phenyl-CN⟩—OCH(CH$_3$)C$_6$H$_{13}$ | 30.7° C. | $S_A$ | 22° |
| A30  C$_{10}$H$_{21}$O—⟨phenyl⟩—C(=O)O—⟨phenyl⟩—OCH$_2$CH(CH$_3$)—OC$_2$H$_5$ | 16° C. | $S_A$ | 23° |

TABLE 3

| Compound | | Phase on the higher temperature side relative to $S_C*$ phase or $S_C$ phase | Tilt angle (T − T$_c$ = −20° C.) |
|---|---|---|---|
| B9  | C$_7$H$_{15}$—⟨biphenyl⟩—O—C(=O)—⟨phenyl⟩—O—CH(CH$_3$)C$_6$H$_{13}$ | Ch | 42° |
| B10 | C$_8$H$_{17}$O—⟨biphenyl⟩—O—C(=O)—⟨phenyl⟩—O—CH(CH$_3$)C$_6$H$_{13}$ | Ch | 45° |
| B11 | C$_9$H$_{19}$O—⟨biphenyl⟩—O—C(=O)—⟨phenyl-Cl⟩—O—CH(CH$_3$)C$_6$H$_{13}$ | Ch | |
| B12 | C$_7$H$_{15}$O—⟨phenyl⟩—CH$_2$—O—⟨biphenyl⟩—O—CH(CH$_3$)C$_6$H$_{13}$ | I | 35° |
| B13 | C$_8$H$_{17}$O—⟨phenyl⟩—O—CH$_2$—⟨biphenyl⟩—O—CH(CH$_3$)C$_6$H$_{13}$ | I | 33° |
| B14 | C$_8$H$_{17}$O—⟨biphenyl⟩—CH$_2$—O—⟨phenyl⟩—O—CH(CH$_3$)C$_6$H$_{13}$ | I | 31° |
| B15 | C$_9$H$_{19}$O—⟨biphenyl⟩—O—CH$_2$—⟨phenyl⟩—O—CH(CH$_3$)C$_6$H$_{13}$ | I | 41° |
| B16 | C$_7$H$_{15}$—⟨biphenyl⟩—O—CH$_2$—⟨phenyl⟩—O—CH(CH$_3$)C$_6$H$_{13}$ | I | 30° |
| B17 | C$_8$H$_{17}$O—⟨phenyl⟩—O—C(=O)—⟨biphenyl⟩—O—CH(CH$_3$)C$_3$H$_7$ | Ch | 38° |

TABLE 3-continued

| Compound | | Phase on the higher temperature side relative to $S_C^*$ phase or $S_C$ phase | Tilt angle (T − $T_c$ = −20° C.) |
|---|---|---|---|
| B18 | $C_7H_{15}$—⟨⟩—⟨⟩—O—C(=O)—⟨Cl⟩—O—CH(CH₃)C₆H₁₃* | Ch | 38° |
| B19 | $C_{10}H_{21}$O—⟨⟩—⟨⟩—O—C(=O)—⟨Cl⟩—O—CH(CH₃)C₆H₁₃* | I | 41° |
| B20 | $C_8H_{17}$O—⟨⟩—⟨⟩—O—C(=O)—⟨Cl⟩—O—CH(CH₃)C₆H₁₃* | Ch | 41° |
| B21 | $C_8H_{17}$O—⟨⟩—⟨⟩—O—C(=O)—⟨F⟩—O—CH(CH₃)C₆H₁₃* | Ch | 36° |
| B22 | $C_{12}H_{25}$O—⟨⟩—⟨⟩—O—C(=O)—⟨F⟩—O—CH(CH₃)C₆H₁₃* | I | 38° |
| B23 | $C_8H_{17}$O—⟨⟩—CH₂—O—⟨⟩—⟨⟩—CH₂CH(CH₃)C₂H₅* | I | |
| B24 | $C_8H_{17}$O—⟨⟩—CH₂—O—⟨⟩—O—C(=O)—⟨⟩—O—CH(CH₃)C₆H₁₃* | Ch | 43° |
| B25 | $C_8H_{17}$O—⟨⟩—C(=O)—O—⟨⟩—⟨⟩—O—CH(CH₃)C₆H₁₃* | Ch | 34° |
| B26 | $C_8H_{17}$O—⟨⟩—O—C(=O)—⟨⟩—⟨⟩—O—CH(CH₃)C₆H₁₃* | Ch | 39° |
| B27 | $C_{10}H_{21}$O—⟨⟩—⟨⟩—O—CH₂CH(CH₃)C₂H₅* | I | |
| B28 | C₂H₅*CH(CH₃)CH₂O—⟨⟩—O—C(=O)—⟨⟩—C(=O)—O—⟨⟩—O—CH₂CH(CH₃)C₂H₅* | Ch | |

TABLE 3-continued
| Compound | | Phase on the higher temperature side relative to $S_C^*$ phase or $S_C$ phase | Tilt angle (T − T$_c$ = −20° C.) |
|---|---|---|---|
| B29 | 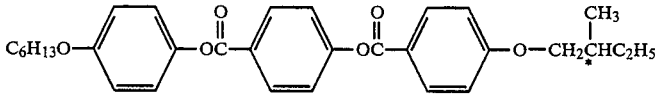 | Ch | |
| B30 | 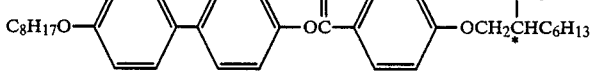 | Ch | |
| B31 | 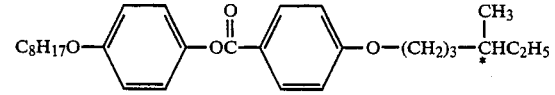 | Ch | |
| B32 | 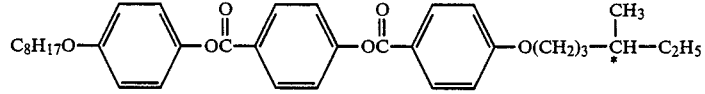 | Ch | |
| B33 | 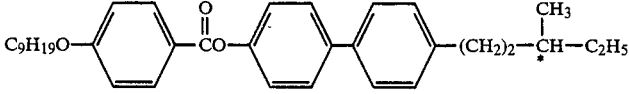 | Ch | |
| B34 | 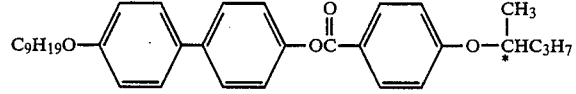 | I | 44° |
| B35 | 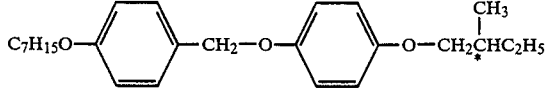 | I | |
| B36 | 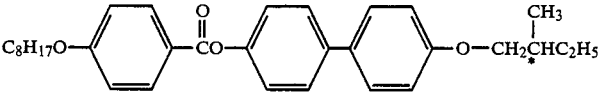 | Ch | |
| B37 | 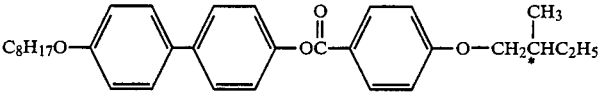 | Ch | 42° |
| B38 | 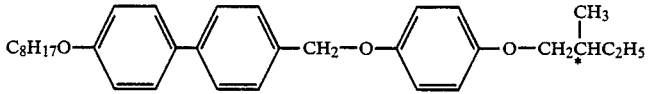 | I | |
| B39 | 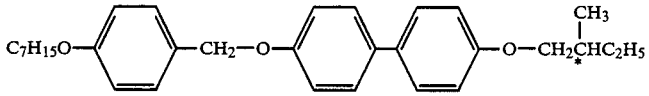 | I | |
| B40 | 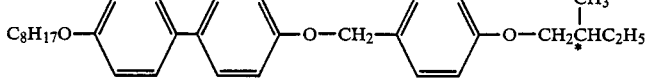 | I | |
| B41 | 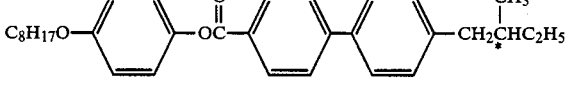 | Ch | 45° |

TABLE 3-continued

| Compound | | Phase on the higher temperature side relative to $S_C^*$ phase or $S_C$ phase | Tilt angle $(T - T_c = -20°\text{ C.})$ |
|---|---|---|---|
| B42 | $C_8H_{17}O$—⟨⟩—⟨⟩—O-CO-*CH(CH₃)CH₂C₂H₅ | Ch | |
| B43 | $C_8H_{17}O$—⟨⟩—⟨⟩—O-CO—⟨⟩—O-CO-*CH(CH₃)CH₂C₂H₅ | Ch | 38° |
| B44 | $C_8H_{17}$—⟨⟩—CO-O—⟨⟩—⟨⟩—O-CO-*CH(CH₃)CH₂C₂H₅ | Ch | 37° |
| B45 | $C_8H_{17}O$—⟨⟩—O-CO—⟨⟩—CO-O—⟨⟩—O-*CH(CH₃)C₆H₁₃ | Ch | 48° |
| B46 | $C_{16}H_{33}O$—⟨⟩—N=N—⟨⟩—O-CH₂*CH(CH₃)CH₂C₂H₅ | I | |
| B47 | $C_{11}H_{23}O$—⟨⟩—N=N(O)—⟨⟩—O-*CH(CH₃)C₆H₁₃ | Ch | |
| B48 | $C_9H_{19}$—⟨⟩—CO-O—⟨⟩—$C_8H_{17}$ | N | |
| B49 | $C_8H_{17}O$—⟨⟩—CO-O—⟨⟩—$OC_8H_{17}$ | N | |
| B50 | $C_6H_{13}$—⟨⟩—O-CO—⟨⟩—O-CO-$C_6H_{13}$ | N | |
| B51 | $C_8H_{17}O$-CO—⟨⟩—⟨⟩—O-CH₂*CH(CH₃)CH₂C₂H₅ | Ch | |
| B52 | $C_7H_{15}$—⟨pyridine⟩—⟨⟩—O(CH₂)₄*CH(CH₃)CH₂C₂H₅ | I | 35.8 |
| B53 | $C_8H_{17}$—⟨pyridine⟩—⟨⟩—$OC_8H_{17}$ | I | |

TABLE 3-continued

| Compound | | Phase on the higher temperature side relative to $S_{C^*}$ phase or $S_C$ phase | Tilt angle ($T - T_c = -20°$ C.) |
|---|---|---|---|
| B54 | $C_{10}H_{21}O$—⟨benzene⟩—⟨benzene-F⟩—$O(CH_2)_5\overset{*}{C}H(CH_3)C_2H_5$ | I | |
| B55 | $C_{10}H_{21}O$—⟨benzene⟩—⟨benzene⟩—$O(CH_2)_3\overset{*}{C}H(CH_3)C_2H_5$ | I | |
| B56 | $C_9H_{19}OCO$—⟨benzene⟩—COO—⟨benzene⟩—$O(CH_2)_5\overset{*}{C}H(CH_3)C_2H_5$ | Ch | |
| B57 | $C_{10}H_{21}O$—⟨benzene⟩—COO—⟨benzene-F⟩—$O(CH_2)_6\overset{*}{C}H(CH_3)C_2H_5$ | I | |
| B58 | $C_8H_{17}$—⟨benzene⟩—⟨benzene⟩—OCO—⟨benzene-F⟩—$OCH_2\overset{*}{C}H(CH_3)C_2H_5$ | Ch | 36.6 |
| B59 | $C_2H_5\overset{*}{C}H(CH_3)-(CH_2)_3-O$—⟨benzene⟩—OCO—⟨benzene⟩—⟨benzene⟩—$O\overset{*}{C}H(CH_3)C_6H_{13}$ | Ch | 40.0 |
| B60 | $C_8H_{17}O$—⟨benzene⟩—OCO—⟨benzene⟩—⟨benzene-F⟩—$O\overset{*}{C}H(CH_3)C_6H_{13}$ | Ch | 32.3 |
| B61 | $C_9H_{19}$—⟨benzene⟩—N=N—⟨benzene-F⟩—$O\overset{*}{C}H(CH_3)C_6H_{13}$ | Ch | |
| B62 | $C_8H_{17}$—⟨pyrimidine⟩—⟨benzene⟩—⟨benzene⟩—$OC_5H_{11}$ | N | |
| B63 | $C_8H_{17}$—⟨pyrimidine⟩—⟨benzene⟩—⟨benzene⟩—OCO—⟨benzene⟩—$O\overset{*}{C}H(CH_3)C_6H_{13}$ | Ch | 51.3 |

Most of the liquid crystal compounds listed above in Table 2 and Table 3 are known and have already been disclosed in for example, Japanese patent application laid-open Nos. Sho 59-219251/1984, Sho 59-231043/1984, Sho 60-13729/1985, Sho 60-51147/1985, Sho 60-54341/1985, Sho 61-43/1986, Sho 61-22051/1986, Sho 61-63633/1986, Sho 61-63638/1986, Sho 61-183256/1986, Sho 61-210056/1986, Sho 62-155257/1987, Sho 62-169765/1987, Sho 62-223171/1987, Sho 62-223172/1987, etc.

Further, the most of the remainder of the liquid crystal compounds will be laid open before long, for example, under the following Japanese patent application numbers: Sho 61-96018/1986, Sho 61-165895/1986, Sho 61-192516/1982, Sho 61-217388/1986, etc.

pounds exhibiting an $S_A$ phase on the higher temperature side relative to the $S_C{}^*$ phase:

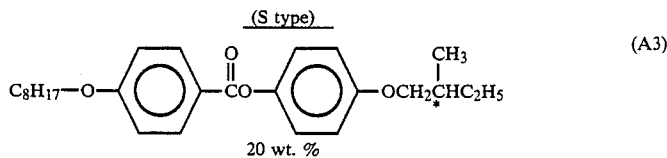

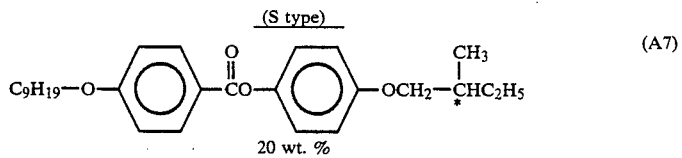

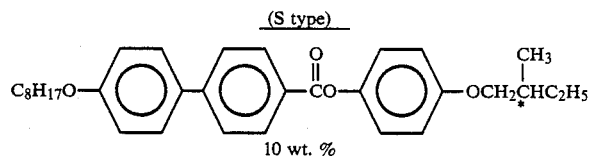

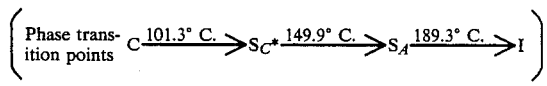

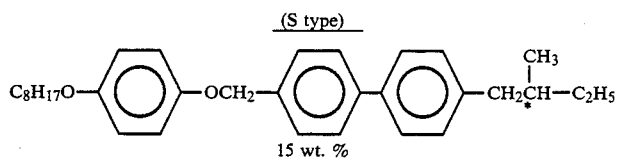

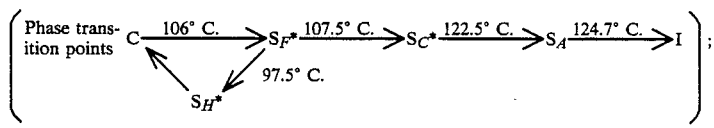

Further, compounds other than the above listed ones, too, may be prepared according to the processes described in the above mentioned patent application laid-open numbers and patent application numbers or combination of known preparations.

The present invention will be described in more detail by way of Examples, but it should not be construed to be limited thereto.

Further, the spontaneous polarization value (Ps) was measured according to the Sowyer-Tower method; the helical pitch (P) was sought by using a cell of about 200 μm thick subjected to homogeneous alignment and directly measuring the interval between dechiralization lines corresponding to the helical pitch; and the tilt angle (θ) was sought from a moved angle (corresponding to 2θ) from an extinction position observed under crossed nicols when an electric field sufficiently higher than the critical electric field is impressed to a cell subjected to homogeneous alignment to another extinction position observed when a polarity is inverted therefrom. Preparation of compositions was carried out by mixing the respective definite weights of liquid crystal compounds while dissolving on heating in a sample bottle.

EXAMPLE 1

A chiral smectic liquid crystal composition consisting of the following chiral smectic liquid crystal comthe following chiral smectic liquid crystal compound exhibiting no $S_A$ phase on the higher temperature side relative to the $S_C{}^*$ phase:

and the following nematic liquid crystal compound;

exhibited an $S_C{}^*$ phase in the temperature range of 0° to 80° C.; exhibited an $S_A$ phase on the higher temperature side relative thereto; formed a Ch phase at 88° C.; and formed an isotropic liquid at 100° C. This liquid crystal composition had a spontaneous polarization value at 25° C. of 14 nC/cm², a tilt angle at 25° C. of 31° and a helical pitch at 75° C. of 21 μm and was superior in both alignment property and contrast. Thus a ferroelectric chiral smectic liquid crystal composition very suitable for a guest-host display mode was obtained.

EXAMPLE 2

A chiral smectic liquid crystal composition consisting of a chiral smectic compound exhibiting an $S_A$ phase on the higher temperature side relative to the $S_C^*$ phase, that is,

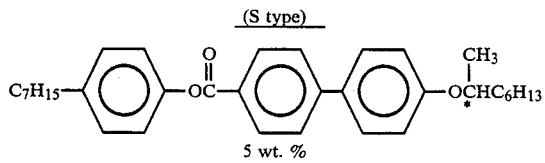

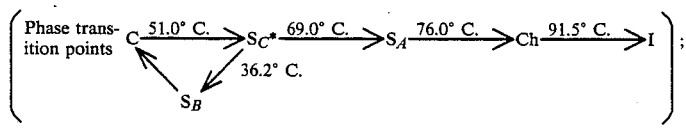

chiral smectic liquid crystal compounds exhibiting no $S_A$ phase on the higher temperature side relative to the $S_C^*$ phase, that is,

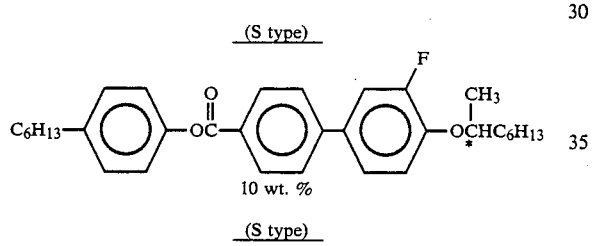

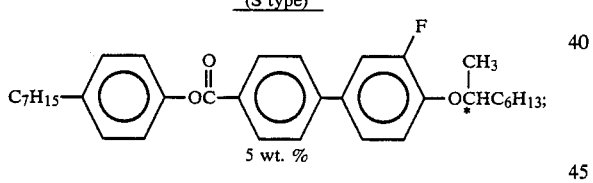

a smectic liquid crystal composition (M-1) exhibiting an $S_A$ phase on the higher temperature side relative to the $S_C$ phase, which composition consists of five liquid crystal pyrimidine compounds and five liquid crystal pyridine compounds, listed later,

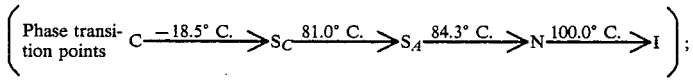

a smectic composition (M-2) exhibiting an $S_A$ phase on the higher temperature side relative to the $S_C$ phase and consisting of five liquid crystal pyrimidines, listed later M-2 15 wt. %

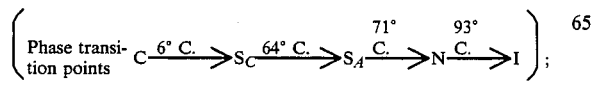

and an optionally active compound having no mesophase, that is,

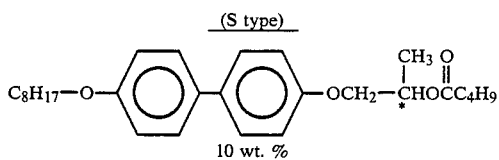

exhibited the $S_C^*$ phase in a temperature range of −26° C. to +68° C., exhibited the $S_A$ phase on the higher temperature side relative thereto, formed a Ch phase at 78° C. and formed an isotropic liquid at 85° C., and also had a spontaneous polarization value at 25° C. of 16.5 nC/cm$^2$ and a tilt angle at 25° C. of 30°.

The above-mentioned M-1 was a mixture of the following 10 compounds in equal quantities:

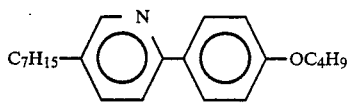

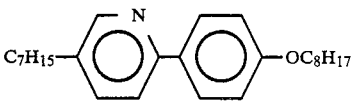

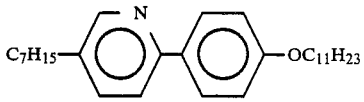

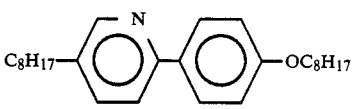

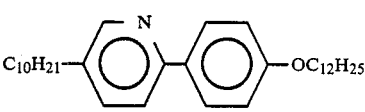

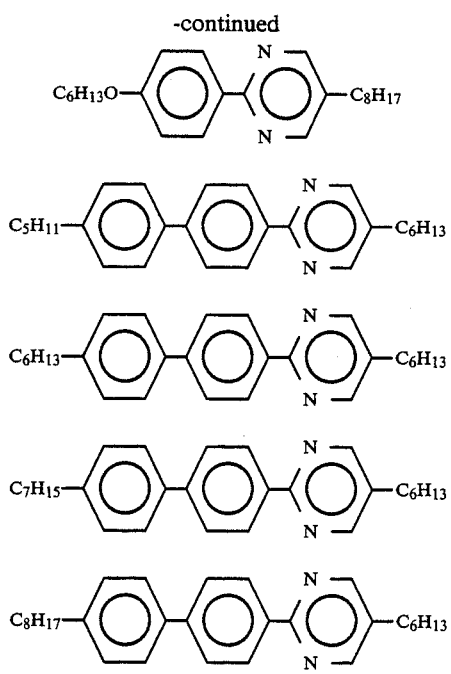

and the above-mentioned M-2 was a composition consisting of the following 5 components:

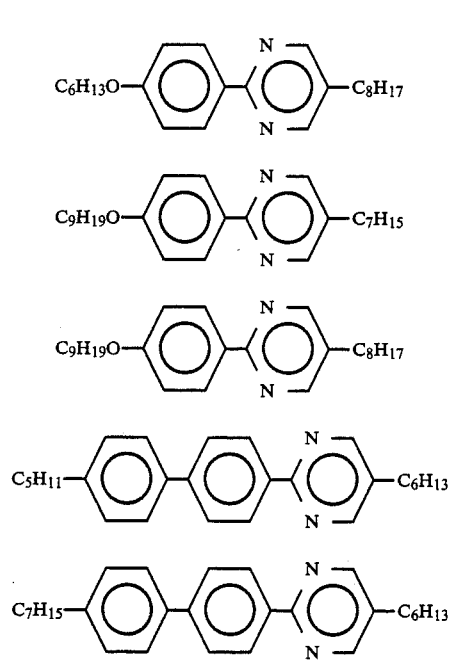

35 wt. %

10 wt. %

20 wt. %

20 wt. %

15 wt. %

EXAMPLE 3

A chiral smectic liquid crystal composition consisting of chiral smectic liquid crystal compounds exhibiting an $S_A$ phase on the higher temperature side relative to the $S_C*$ phase, that is,

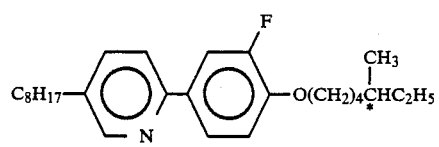

5 wt. %

$\left(\begin{array}{l}\text{Phase transi-}\\\text{tion points}\end{array}\; C \xrightarrow{32.1°\,C.} S_C* \xrightarrow{33.9°\,C.} S_A \xrightarrow{38.8°\,C.} I\right)$

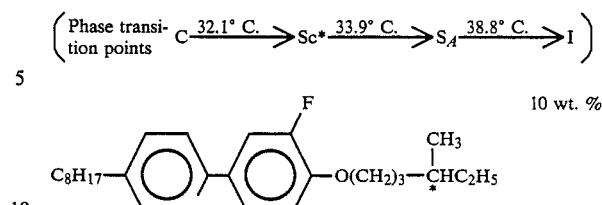

10 wt. %

$\left(\begin{array}{l}\text{Phase transi-}\\\text{tion points}\end{array}\; C \xrightarrow{35.5°\,C.} S_C* \xrightarrow{39.9°\,C.} S_A \xrightarrow{41.5°\,C.} I\right);$ a chiral smectic liquid crystal compound exhibiting no $S_A$ phase on the higher temperature side relative to the $S_C*$ phase, that is,

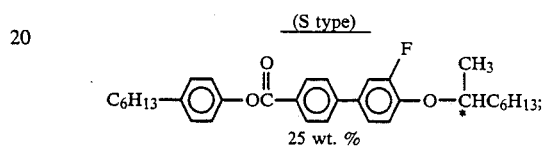

25 wt. % and smectic liquid crystal compounds exhibiting no $S_A$ phase on the higher temperature side relative to $S_C$ phase, that is,

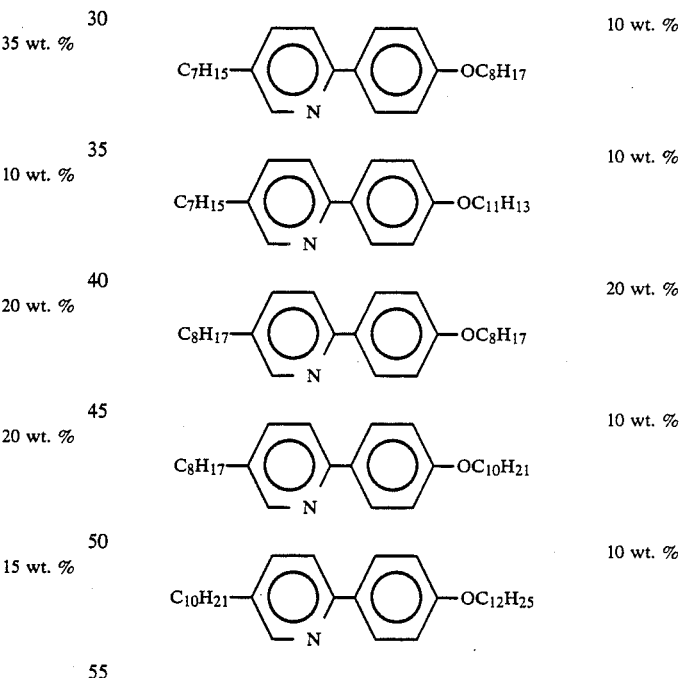

10 wt. %

10 wt. %

20 wt. %

10 wt. %

10 wt. % exhibited the $S_C*$ phase in a temperature range of 0° to 68° C., formed the $S_A$ phase on the higher temperature side relative thereto, formed an isotropic liquid at 71° C., and had a spontaneous polarization value at 25° C. of 19 nC/cm² and a tilt angle at 25° C. of 30° and was superior in both the alignment property and contrast; hence the ferroelectric chiral smectic liquid crystal composition was very suitable for a guest-host display mode.

EXAMPLE 4

A chiral smectic liquid crystal composition consisting of chiral smectic liquid crystal compounds exhibiting no $S_A$ phase on the higher temperature side relative to the $S_C^*$ phase, that is,

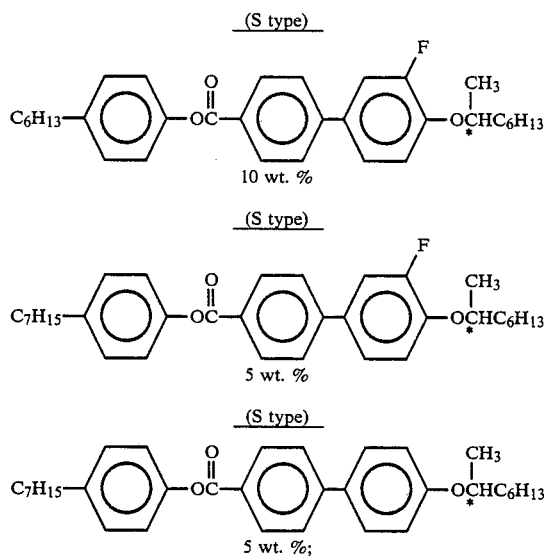

a smectic liquid crystal composition (M-3) an $S_A$ phase on the higher temperature side relative to the $S_C$ phase and consisting of six liquid crystal pyrimidine compounds and six liquid crystal pyridine compounds,

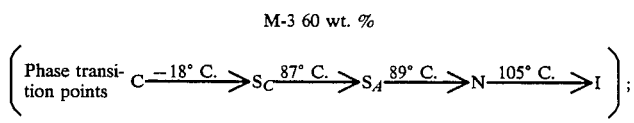

compounds having $S_A$ phase and nematic phase as mesomorphic phases and a having an no $S_C$ phase, that is,

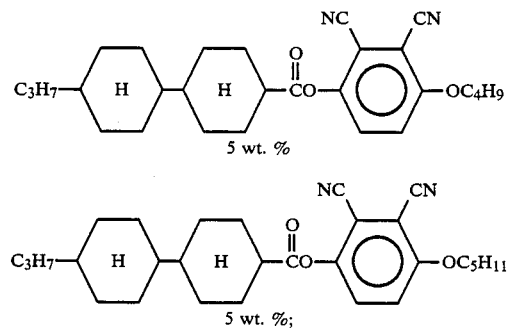

and an optionally active compound having no mesomorphic phase, that is,

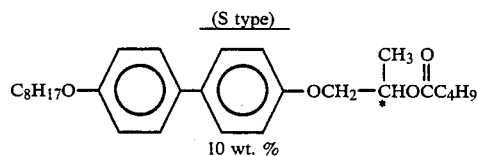

exhibited an $S_C^*$ phase in the temperature range of −30° to +80° C., exhibited an $S_A$ phase on the higher temperature side relative thereto, formed a Ch phase at 81° C. and formed an isotropic liquid at 99° C., and had a spontaneous polarization value at 25° C. of 20.8 nC/cm² and a tilt angle at 25° C. of 31.5°, and was superior in both the alignment property and contrast; hence the ferroelectric chiral smectic liquid crystal composition was very suitable for a display mode of guest-host type. In addition, the above-mentioned composition M-3 had the following composition:

Composition M-1    83.4%

8.3%

C₅H₁₁—〈N〉—〈 〉—〈 〉—C₃H₇

8.3%

C₇H₁₅—〈 〉—〈 〉—〈N,N〉—C₈H₁₇

EXAMPLE 5

To the ferroelectric chiral smectic liquid crystal composition prepared in Example 2 was added an anthraquinone dyestuff (D-16, tradename of a product manufactured by BDH Company) as a dichroic dyestuff in 3% by weight, to prepare a composition for the so-called guest-host type display, followed by filling the composition in a cell of 8 μm thick, provided with transparent electrodes each having PVA as an aligning agent applied thereonto and rubbing the surfaces to subject them to parallel aligning treatment, providing a polarizing plate so that the polarizing surface might be parallel to the molecular axis, and impressing an alternating current of a low frequency of 0.5 Hz and 30 V to the cell. As a result, a clear switching phenomenon having a very good contrast was observed. The response time at that time was sought from change in the intensity of transmitted light to give 100 μsec at 25° C.; thus a display element of a guest-host type having a very high response rate was obtained.

What we claim is:

1. A ferroelectric smectic C liquid crystal mixture having a smectic A phase region within 30° C. on the higher temperature side relative to a chiral smectic C phase and also having a tilt angle at its chiral smectic C phase in the range of 30° to 60°, which mixture is selected from the group consisting of the following mixtures 1 to 7:

Mixture 1

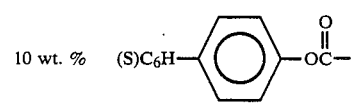

37

-continued 5 wt. % [structure: biphenyl with F, CH₃, OCHC₆H₁₃ group]

5 wt. % (S)C₇H₁₅—[phenyl]—OC(=O)—

5 wt. % [structure: biphenyl with F, CH₃, OCHC₆H₁₃ group]

5 wt. % (S)C₇H₁₅—[phenyl]—OC(=O)—

5 wt. % [structure: biphenyl with CH₃, OCHC₆H₁₃ group]

5 wt. % C₇H₁₅—[pyridine]—[phenyl]—OC₄H₉

5 wt. % C₇H₁₅—[pyridine]—[phenyl]—OC₈H₁₇

5 wt. % C₇H₁₅—[pyridine]—[phenyl]—OC₁₁H₂₃

5 wt. % C₈H₁₇—[pyridine]—[phenyl]—OC₈H₁₇

5 wt. % C₁₀H₂₁—[pyridine]—[phenyl]—OC₁₂H₂₅

5 wt. % C₆H₁₃O—[phenyl]—[pyrimidine]—C₈H₁₇

5 wt. % C₅H₁₁—[phenyl]—[phenyl]—[pyrimidine]—C₆H₁₃

5 wt. % C₆H₁₃—[phenyl]—[phenyl]—[pyrimidine]—C₆H₁₃

38

-continued 5 wt. % C₇H₁₅—[phenyl]—[phenyl]—[pyrimidine]—C₆H₁₃

5 wt. % C₈H₁₇—[phenyl]—[phenyl]—[pyrimidine]—C₆H₁₃

5 wt. % C₅H₁₁—[pyridine]—[phenyl]—[phenyl]—C₃H₇

5 wt. % C₇H₁₅—[phenyl]—[phenyl]—[pyrimidine]—C₈H₁₇

5 wt. % C₃H₇—[H]—[H]—C(=O)O—[phenyl with CN, CN]—OC₄H₉

5 wt. % C₃H₇—[H]—[H]—C(=O)O—[phenyl with NC, CN]—OC₅H₁₁ and 10 wt. % (S)C₈H₁₇O—[phenyl]—[phenyl]—OCH₂—CH(CH₃)OC(=O)C₄H₉

Mixture 2

5 wt. % (S)C₇H₁₅—[phenyl]—OC(=O)—

[structure: biphenyl with CH₃, OCHC₆H₁₃]

10 wt. % (S)C₆H₁₃—[phenyl]—OC(=O)—

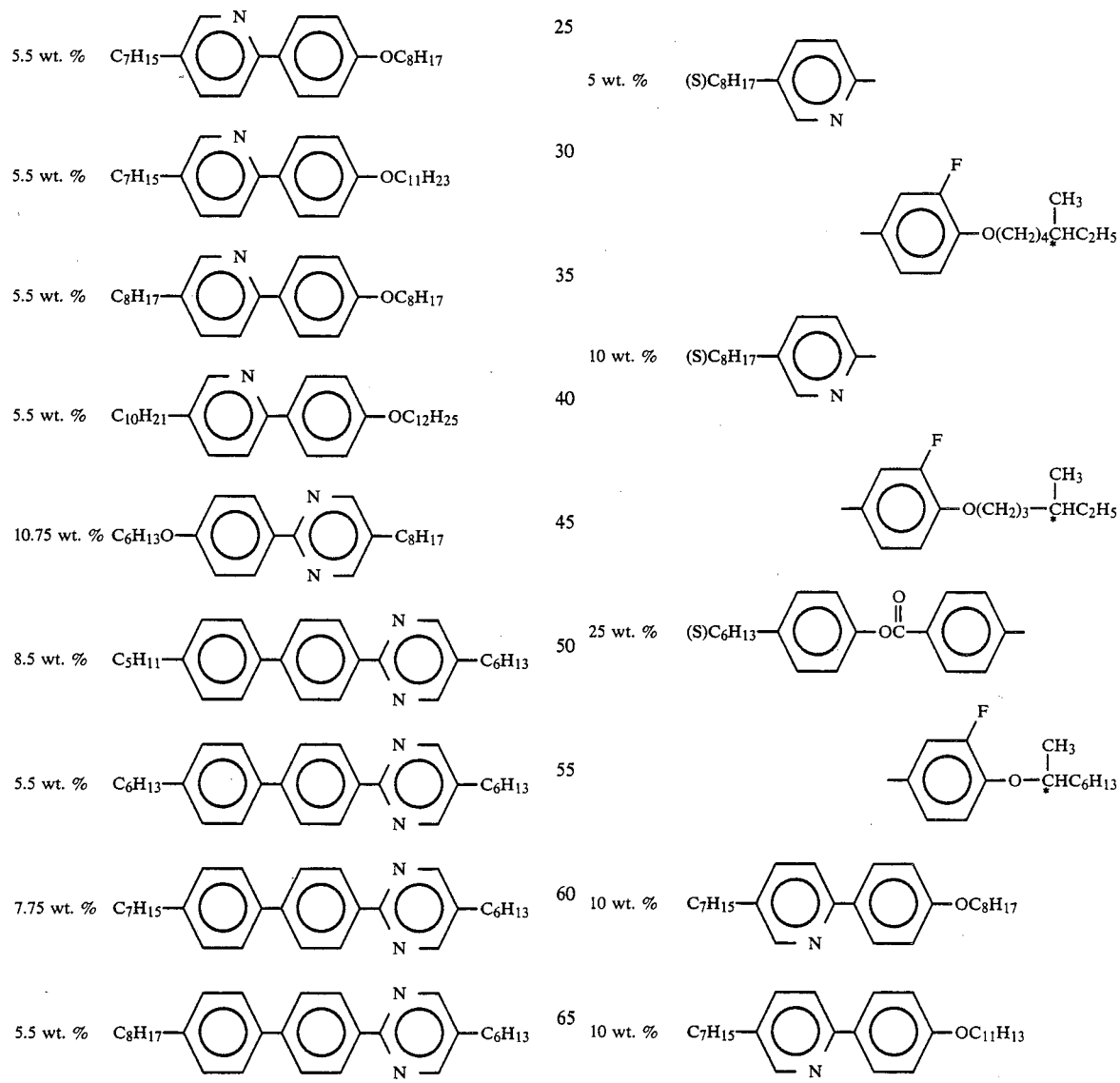

4,966,727
41
-continued
20 wt. % 
10 wt. % 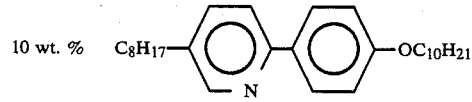
and
10 wt. % 
Mixture 4
20 wt. % 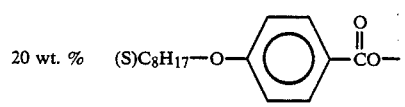
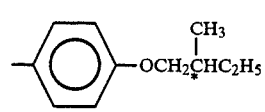
20 wt. % 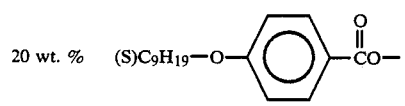
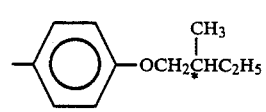
10 wt. % 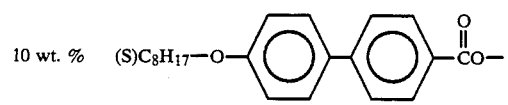
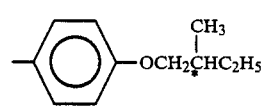
15 wt. % 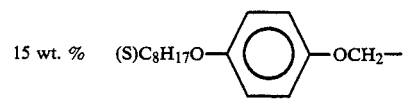
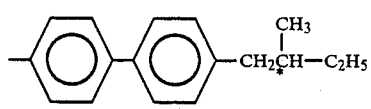
25 wt. % 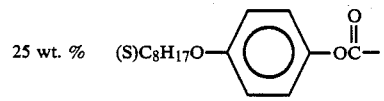
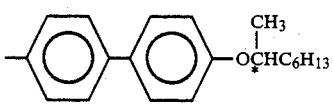
42
-continued
and
10 wt. % 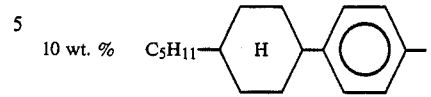
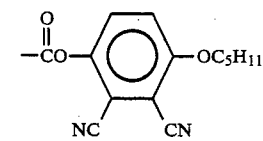
Mixture 5
60 wt. % 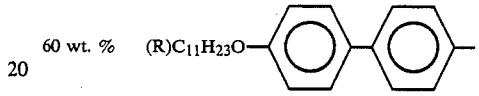
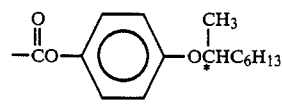
and
40 wt. % 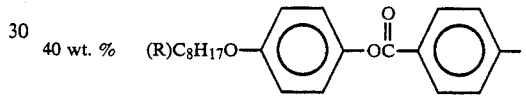
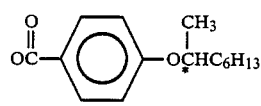
Mixture 6
60 wt. % 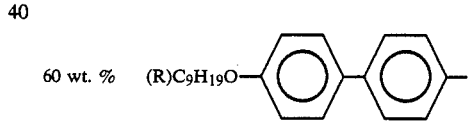
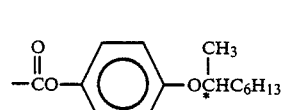
and
40 wt. % 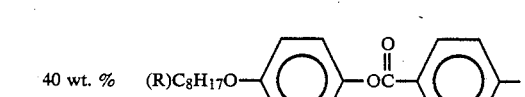
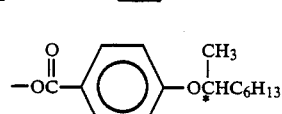
Mixture 7
30 wt. % 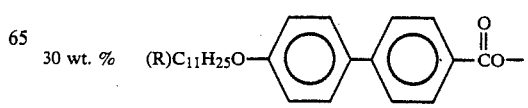

-continued

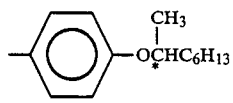

and 70 wt. % 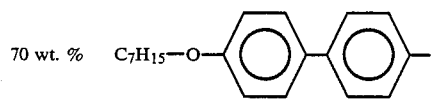

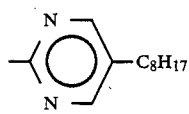

2. A ferroelectric smectic C liquid crystal mixture according to claim 1 wherein said mixture is the Mixture 1 as defined in claim 1.

3. A ferroelectric smectic C liquid crystal mixture according to claim 1 wherein said mixture is the Mixture 2 as defined in claim 1.

4. A ferroelectric smectic C liquid crystal mixture according to claim 1 wherein said mixture is the Mixture 3 as defined in claim 1.

5. A ferroelectric smectic C liquid crystal mixture according to claim 1 wherein said mixture is the Mixture 4 as defined in claim 1.

6. A ferroelectric smectic C liquid crystal mixture according to claim 1 wherein said mixture is the Mixture 5 as defined in claim 1.

7. A ferroelectric smectic C liquid crystal mixture according to claim 1 wherein said mixture is the Mixture 6 as defined in claim 1.

8. A ferroelectric smectic C liquid crystal mixture according to claim 1 wherein said mixture is the Mixture 7 as defined in claim 1.

9. In a light-switching element containing a ferroelectric smectic C liquid crystal composition, the improvement wherein the composition is a ferroelectric smectic C composition as set forth in claim 1.

* * * * *

UNITED STATES PATENT AND TRADEMARK OFFICE
CERTIFICATE OF CORRECTION

PATENT NO. : 4,966,727

DATED : October 30, 1990

INVENTOR(S) : Ichihashi et al.

It is certified that error appears in the above-identified patent and that said Letters Patent is hereby corrected as shown below:

ON TITLE PAGE:

In item [56] References Cited change "4,729,847 3/1958 Miyazawa et al....252/299.64" to --4,729,847 3/1988 Miyazawa et al....252/299.64--.

Column 36, line 66, change "$C_6H$" to --$C_6H_{13}$--.

Signed and Sealed this

Fifth Day of May, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,966,727

DATED : October 30, 1990

INVENTOR(S) : Ichihashi et al

It is certified that error appears in the above-identified patent and that said Letters Patent is hereby corrected as shown below:

Column 34, line 37, change "$OC_{11}H_{13}$" to --$OC_{11}H_{23}$--.

Column 40, line 66, change "$OC_{11}H_{13}$" to --$OC_{11}H_{23}$--.

Signed and Sealed this

Thirtieth Day of March, 1993

Attest:

STEPHEN G. KUNIN

*Attesting Officer*  *Acting Commissioner of Patents and Trademarks*